US00RE47663E

(19) United States
(12) Reissued Patent
Cai

(10) Patent Number: US RE47,663 E
(45) Date of Reissued Patent: *Oct. 22, 2019

(54) MULTICAST/BROADCAST SINGLE FREQUENCY NETWORK CONTROL INFORMATION TRANSMISSION

(71) Applicant: BlackBerry Limited, Waterloo (CA)

(72) Inventor: Zhijun Cai, Ashburn, VA (US)

(73) Assignee: BlackBerry Limited, Waterloo, Ontario (CA)

( * ) Notice: This patent is subject to a terminal disclaimer.

(21) Appl. No.: 14/965,126

(22) Filed: Dec. 10, 2015

Related U.S. Patent Documents

Reissue of:
(64) Patent No.: 8,649,795
Issued: Feb. 11, 2014
Appl. No.: 11/931,710
Filed: Oct. 31, 2007

U.S. Applications:
(60) Provisional application No. 60/970,106, filed on Sep. 5, 2007.

(51) Int. Cl.

| | |
|---|---|
| ***H04W 72/00*** | (2009.01) |
| ***H04W 4/00*** | (2018.01) |
| ***H04M 3/00*** | (2006.01) |
| ***H04L 12/413*** | (2006.01) |
| ***H04L 12/18*** | (2006.01) |

(52) U.S. Cl.
CPC ..... *H04L 12/413* (2013.01); *H04L 12/189* (2013.01); *H04W 72/005* (2013.01)

(58) Field of Classification Search
CPC . H04L 12/413; H04L 12/189; H04W 72/0005
See application file for complete search history.

(56) References Cited

U.S. PATENT DOCUMENTS

| | | | | |
|---|---|---|---|---|
| 5,404,355 | A * | 4/1995 | Raith | 370/311 |
| 8,077,649 | B2 | 12/2011 | Cai | |
| 8,538,444 | B2 | 9/2013 | Lee et al. | |
| 8,649,795 | B2 | 2/2014 | Cai | |
| 8,867,423 | B2 | 10/2014 | Cai | |
| 2003/0194992 | A1 | 10/2003 | Kim et al. | |

(Continued)

FOREIGN PATENT DOCUMENTS

| | | | |
|---|---|---|---|
| CN | 1463103 | A | 12/2003 |
| EP | 1353523 | A1 | 10/2003 |

(Continued)

OTHER PUBLICATIONS

Final Office Action dated Oct. 21, 2016; U.S. Appl. No. 11/737,984, filed Apr. 20, 2007; 18 pages.

(Continued)

*Primary Examiner* — Adam L Basehoar
(74) *Attorney, Agent, or Firm* — Trop, Pruner & Hu, P.C.

(57) ABSTRACT

A method for providing control information for a multimedia broadcast multicast service (MBMS) in network access equipment is provided. The method includes separating a multicast control channel of an MBMS transmission into a first portion and a second portion, placing in the first portion information related to the second portion, and placing in the second portion information related to receiving a multicast traffic channel portion of the MBMS transmission.

18 Claims, 7 Drawing Sheets

(56) References Cited

U.S. PATENT DOCUMENTS

| | | | | |
|---|---|---|---|---|
| 2003/0207696 | A1 | 11/2003 | Willenegger et al. | |
| 2004/0116139 | A1 | 6/2004 | Yi et al. | |
| 2004/0202140 | A1* | 10/2004 | Kim | H04W 72/005 370/335 |
| 2005/0041681 | A1* | 2/2005 | Lee et al. | 370/437 |
| 2005/0043035 | A1 | 2/2005 | Diesen et al. | |
| 2005/0070277 | A1 | 3/2005 | Hu | |
| 2005/0107036 | A1 | 5/2005 | Song et al. | |
| 2005/0165945 | A1 | 7/2005 | Lee et al. | |
| 2006/0018279 | A1 | 1/2006 | Agrawal et al. | |
| 2006/0050718 | A1 | 3/2006 | Corson et al. | |
| 2006/0067281 | A1 | 3/2006 | Kwak et al. | |
| 2006/0128400 | A1* | 6/2006 | Liang | H04L 5/12 455/458 |
| 2006/0189272 | A1 | 8/2006 | Willenegger et al. | |
| 2007/0047493 | A1 | 3/2007 | Park et al. | |
| 2007/0167181 | A1 | 7/2007 | Ramesh et al. | |
| 2007/0189236 | A1 | 8/2007 | Ranta-aho et al. | |
| 2008/0031245 | A1 | 2/2008 | Pekonen | |
| 2008/0045224 | A1 | 2/2008 | Lu et al. | |
| 2008/0259842 | A1 | 10/2008 | Cal | |
| 2009/0061914 | A1 | 3/2009 | Cai | |
| 2009/0323574 | A1* | 12/2009 | Koskinen | H04W 48/10 370/312 |
| 2010/0189026 | A1* | 7/2010 | Lee et al. | 370/312 |

FOREIGN PATENT DOCUMENTS

| | | | |
|---|---|---|---|
| EP | 1501328 | A2 | 1/2005 |
| EP | 1513368 | A2 | 3/2005 |
| EP | 1796404 | A1 | 6/2007 |
| EP | 1804529 | A1 | 7/2007 |
| EP | 1804529 | A1 | 6/2008 |
| GB | 2412040 | A | 9/2005 |
| WO | 2004068884 | A1 | 8/2004 |
| WO | 2004102878 | A1 | 11/2004 |
| WO | 2005067175 | A1 | 7/2005 |
| WO | 2005078962 | A1 | 8/2005 |
| WO | 2005078963 | A1 | 8/2005 |
| WO | 2006088301 | A1 | 8/2006 |
| WO | 2007078164 | A1 | 7/2007 |
| WO | 2007092691 | A2 | 8/2007 |

OTHER PUBLICATIONS

Notice of Allowance dated Dec. 29, 2016; U.S. Appl. No. 11/737,984, filed Apr. 20, 2007; 5 pages.
3GPP TR 25.813 v7.1.0; Technical Specification Group Radio Access Network; Evolved Universal Terrestrial Radio Access and Evolved Universal Terrestrial Radio Access Network; Radio Interface Protocol Aspects; Sep. 2006; 41 pages.
3GPP TR 25.814 v7.1.0; Technical Specification Group Radio Access Network; Physical Layer Aspects for Evolved Universal Terrestrial Radio Access; Sep. 2006; 132 pages.
3GPP TS 36.300 v8.3.0; Technical Specification Group Radio Access Network; Evolved Universal Terrestrial Radio Access and Evolved Universal Terrestrial Radio Access Network; Overall Description—Stage 2; Dec. 2007; 121 pages.
3GPP TSG RAN WG2#58bis; "Hierarchical MCCH; R2-072477"; Orlando, Florida; Jun. 25-29, 2007; 4 pages.
3GPP TSG RAN WG2; "MBMS Modulation and Coding State Selection"; R2-061985; Cannes, France; Jun. 27-30, 2006; 6 pages.
3GPP TSG-RAN Meeting #33; "MBMS Transmissions & Synchronization Requirements"; RP-060629; Palm Spring, USA; Sep. 19-22, 2006; 7 pages.
3GPP TSG-RAN WG 3 Meeting #53bis; "Architecture for Content Synchronisation"; R3-061534; Seoul, Korea; Oct. 10-13, 2006; 5 pages.
3GPP TSG-RAN WG RAN3#53; "Synchronization Requirements for MBMS RF Combining in LTE SFN"; R3-061007; Tallinn, Estonia; Aug. 28-Sep. 1, 2006; 3 pages.
3GPP TSG-RAN WG2 Meeting #59; "MCCH Hierarchy and Transmission Modes"; R2-073082; Athens, Greece; Aug. 20-24, 2007, 5 pages.
3GPP TSG-RAN-WG2 Meeting #53; "Centralized Function for LTE MBMS"; R2-061350; Shanghai, China; May 8-12, 2006; 4 pages.
3GPP RAN WG2#59; "MCCH Channel Design"; R2-073132; Athens, Greece, Aug. 20-24, 2007; 4 pages.
3GPP TSG RAN WG2 #59; "MCCH Structure and Transmission in LTE"; R2-073267; Athens, Greece, Aug. 20-24, 2007; 3 pages.
Office Action dated Dec. 1, 2009; U.S. Appl. No. 11/737,984, filed Apr. 20, 2007; 24 pages.
Final Office Action dated Jun. 24, 2010; U.S. Appl. No. 11/737,984, filed Apr. 20, 2007; 18 pages.
Office Action dated Jun. 4, 2012; U.S. Appl. No. 11/737,984, filed Apr. 20, 2007; 35 pages.
Final Office Action dated Dec. 21, 2012; U.S. Appl. No. 11/737,984, filed Apr. 20, 2007; 20 pages.
Advisory Action dated Mar. 15, 2013; U.S. Appl. No. 11/737,984, filed Apr. 20, 2007; 3 pages.
Office Action dated Oct. 7, 2010; U.S. Appl. No. 11/931,710, filed Oct. 31, 2007; 16 pages.
Office Action dated Mar. 11, 2011; U.S. Appl. No. 11/931,710, filed Oct. 31, 2007; 25 pages.
Final Office Action dated Sep. 1, 2011; U.S. Appl. No. 11/931,710, filed Oct. 31, 2007; 18 pages.
Office Action dated Aug. 16, 2013; U.S. Appl. No. 11/931,710, filed Oct. 31, 2007; 37 pages.
Notice of Allowance dated Oct. 8, 2013; U.S. Appl. No. 11/931,710, filed Oct. 31, 2007; 9 pages.
Office Action dated Oct. 14, 2010; U.S. Appl. No. 11/938,000, filed Nov. 9, 2007; 20 pages.
Office Action dated Feb. 28, 2011; U.S. Appl. No. 11/938,000, filed Nov. 9, 2007; 18 pages.
Notice of Allowance dated Aug. 10, 2011; U.S. Appl. No. 11/938,000, filed Nov. 9, 2007; 7 pages.
Final Office Action dated Mar. 28, 2014; U.S. Appl. No. 13/291,824, filed Nov. 8, 2011; 13 pages.
Notice of Allowance dated Jun. 11, 2014; U.S. Appl. No. 13/291,824, filed Nov. 8, 2011; 11 pages.
European Extended Search Report; Application No. 079109016.1; dated Dec. 20, 2007; 7 pages.
European Examination Report; Application No. 07109016.1; dated Sep. 15, 2008; 3 pages.
European Summons to Attend Oral Proceedings; Application No. 07109016.1; dated Dec. 14, 2010; 4 pages.
PCT International Search Report; Application No. PCT/US2008/060457; dated Jan. 5, 2009; 7 pgs.
PCT Written Opinion of the International Searching Authority; Application No. PCT/US2008/060457; dated Jan. 5, 2009; 10 pages.
PCT International Preliminary Report on Patentability; Application No. PCT/US2008/060457; dated Aug. 14, 2009; 14 pages.
Canadian Office Action; Application No. 2,686,544; dated Jun. 4, 2012; 3 pages.
Chinese Office Action; Application No. 20880012866.7; dated Jun. 4, 2012; 18 pages.
Chinese Office Action; Application No. 20880012866.7; dated Feb. 4, 2013; 10 pages.
Chinese Office Action; Application No. 20880012866.7; dated Oct. 21, 2013; 7 pages.
Indian Office Action; Application No. 6210/CHENP/2009; dated Dec. 15, 2014; 2 pages.
Office Action dated May 25, 2016; U.S. Appl. No. 11/737,984, filed Apr. 20, 2007; 27 pages.
European Examination Report; Application No. 14176676.6; dated Jun. 16, 2016; 3 pages.
European Examination Report; Application No. 10184706.9; dated Apr. 17, 2012; 4 pages.
European Extended Search Report; Application No. 14176676.6; dated Sep. 30, 2014; 4 pages.
PCT International Search Report; Application No. PCT/CA2007/002035; dated May 9, 2008; 5 pgs.

(56) References Cited

OTHER PUBLICATIONS

PCT Written Opinion of the International Searching Authority; Application No. PCT/CA2007/002035; dated May 9, 2008; 6 pages.
Canadian Office Action; Application No. 2,698,023; dated Apr. 17, 2013; 7 pages.
Chinese Office Action; Application No. 200780101350.5; dated Sep. 5, 2012; 9 pages.
Chinese Office Action; Application No. 200780101350.5; dated Apr. 3, 2013; 8 pages.
European Extended Search Report; Application No. 07845505.2; dated Oct. 27, 2010; 8 pages.
European Examination Report; Application No. 07845505.2; dated Aug. 10, 2011; 5 pages.
European Examination Report; Application No. 07845505.2; dated Mar. 6, 2012; 5 pages.
European Examination Report; Application No. 07845505.2; dated Feb. 22, 2013; 5 pages.
PCT International Search Report; Application No. PCT/CA2007/002083; dated May 23, 2008; 3 pages.
PCT Written Opinion of the International Searching Authority; Application No. PCT/CA2007/002083; dated May 23, 2008; 5 pages.
PCT International Preliminary Report on Patentability; PCT Application No. PCT/CA2007/002083; dated Sep. 24, 2009; 10 pages.
European Extended Search Report; Application No. 07845553.2; dated Oct. 7, 2010; 9 pages.
European Extended Search Report; Application No. 11189594.2; dated Dec. 12, 2011; 11 pages.
European Extended Search Report; Application No. 10184706.9 dated Dec. 8, 2010; 6 pages.
Cai, Zhijun; U.S. Appl. No. 15/440,809; Titled: "Multicast Control Channel Design"; filed Feb. 23, 2017; 33 pages.
Office Action dated Sep. 15, 2017; U.S. Appl. No. 15/440,809, filed Feb. 23, 2017; 31 pages.
Notice of Allowance dated Jan. 22, 2018; U.S. Appl. No. 15/440,809, filed Feb. 23, 2017; 10 pages.
Cai, Zhijun; U.S. Appl. No. 11/737,984; Titled: "Multicast Control Channel Design", filed Apr. 20, 2007; Specification—28 pgs.; 6 Drawing Sheets (Figures 1-7).
PCT Written Opinion of the International Searching Authority; PCT Application No. PCT/US2008/060457; Jan. 5, 2009; 12 pgs.
PCT Invitation to Pay Additional Fees (Partial PCT Search Report); PCT Application No. PCT/US2008/060457; Sep. 17, 2008; 8 pgs.
3GPP TSG-RAN WG RAN1#46; Tile: Inter E-Node B Node Synchronization in LTE MBMS; R1-061969; Alcatel Shanghai Bell; Tallinn, Estonia; Aug. 28-Sep. 1, 2006; 4 pgs.
3GPP TSG-RAN WG2 Meeting #59; Nokia Siemens Networks, Nokia; Title: MCCH Hierarchy and Transmission Modes; R2-073082; Athens, Greece; Aug. 20-24, 2007; 5 pgs.
3GPP TSG-RAN WG2#57bis; Nokia, Siemens Networks; Title: MCCH Control; R2-071246; St. Julian's, Malta; Mar. 26-30, 2007; 6 pgs.
Nokia Siemens Networks, Nokia; 3GPP TSG-RAN WG2 Meeting #59; Title: "MCCH Hierarchy and Transmission Modes"; R2-073082; Athens, Greece; Aug. 20-24, 2007; 5 pgs.
Nokia Siemens Networks, Nokia; 3GPP TSG-RAN WG2 Meeting #59; Title: "MCCH Content and Transmission"; R2-073086; Athens, Greece, Aug. 20-24, 2007; 5 pgs.
Alcatel-Lucent; 3GPP RAN WG2#59; Title: "MCCH Channel Design"; R2-073132; Athens, Greece, Aug. 20-24, 2007; 4 pgs.
Panasonic; 3GPP TSG RAN WG2 #59; Title: "MCCH Structure and Transmission in LTE"; R2-073267; Athens, Greece, Aug. 20-24, 2007; 3 pgs.
LG Electronics; 3GPP TSG-RAN WG2 #59; Title: "LTE MCCH Structure and Transmission"; R2-073363; Athens, Greece; Aug. 20-24, 2007; 3 pgs.
Nortel; 3GPP TSG RAN WG2#58bis; Title: "Hierarchical MCCH"; R2-072477; Orlando, Florida; Jun. 25-29, 2007; 4 pgs.
Nokia, Siemens Networks; 3GPP TSG-RAN WG2#57bis; Title: "MCCH Control"; R2-071246; St. Julian's Malto; Mar. 26-30, 2007; 6 pgs.
Foreign communication from a related counterpart application—Second European Search Report, EP 07 10 9016, Sep. 15, 2008, 3 pages.
Foreign communication from a related counterpart application—Extended European Search Report, EP Application No. 10184706.9-2412, Dec. 8, 2010, 6 pages.
PCT International Preliminary Report on Patentability; PCT Application No. PCT/CA2007/002035; Mar. 18, 2010; 8 pgs.
Cai, Zhijun; U.S. Appl. No. 11/938,000; Titled: "Indication of Multicast Control Information", filed Nov. 9, 2007.
3GPP TSG-RAN WG2 Meeting #59; "On the MCCH Design;" Research in Motion Limted; R2-073250; Athens, Greece; Aug. 20-24, 2007; 4 pgs.
European Intent to Grant; EP Application No. 07845553.2; Jul. 20, 2011; 4 pgs.
Cai, Zhijun; U.S. Appl. No. 13/291,824; Titled: "Indication of Multicast Control Information", filed Nov. 9, 2011.
Office Action dated Nov. 15, 2013; U.S. Appl. No. 13/291,824, filed Nov. 8, 2011; 38 pages.

* cited by examiner

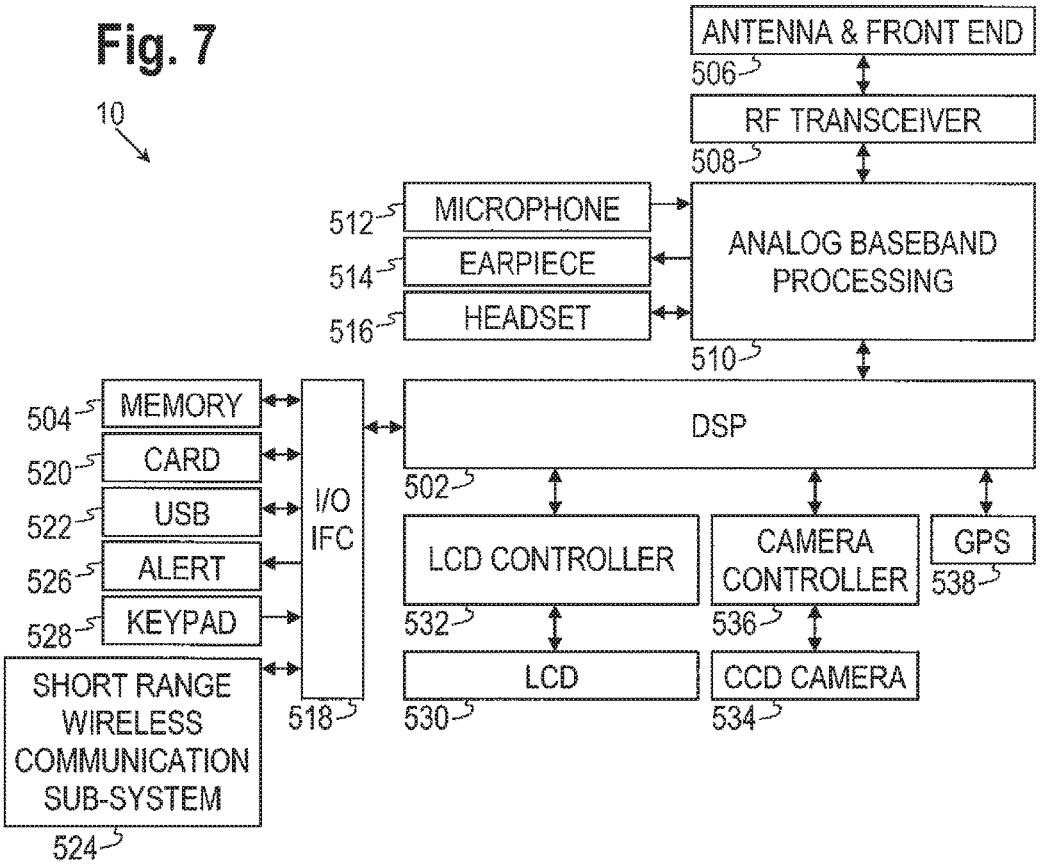
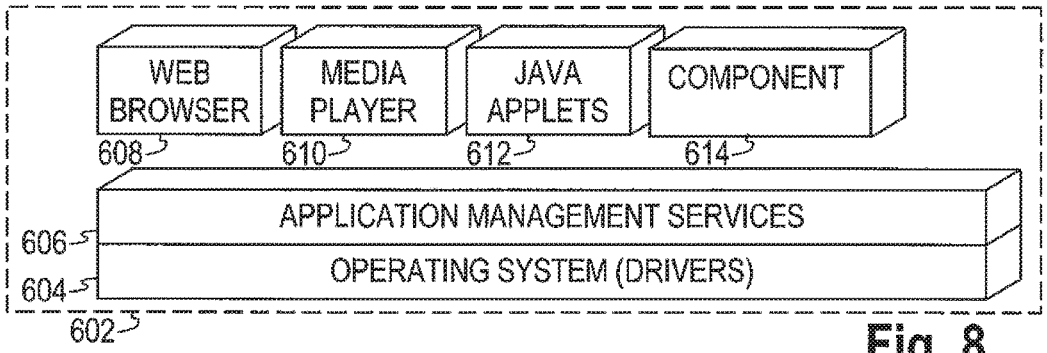
Fig. 8

MULTICAST/BROADCAST SINGLE FREQUENCY NETWORK CONTROL INFORMATION TRANSMISSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

The present application claims priority to U.S. Provisional Patent Application No. 60/970,106, filed Sep. 15, 2007, by Zhijun Cai, entitled "MBSFN Control Information Transmission" which is incorporated by reference herein as if reproduced in its entirety.

BACKGROUND

In traditional wireless telecommunications systems, transmission equipment in a base station transmits signals throughout a geographical region known as a cell. As technology has evolved, more advanced network access equipment has been introduced that can provide services that were not possible previously. This advanced access network equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

A group of LTE-based cells might be under the control of a single entity known as a central control. The central control typically manages and coordinates certain activities with a group of cells such as the scheduling of transmissions and the control of a modulation and coding scheme for the cells. The modulation and coding schemes might include binary phase-shift keying (BPSK), quadrature phase-shift keying (QPSK), quadrature amplitude modulation (QAM), or other schemes that will be familiar to one of skill in the art.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. A set of cells receiving an MBMS can be referred to as a service area. A service area and a region under the control of a central control do not necessarily coincide. For example, a central control might specify so that a first subset of cells under its control will deliver a first MBMS and that a second subset of cells under its control will deliver a second MBMS.

When multiple cells overlap, a UE within the overlapped region can receive transmissions from multiple ENBs. It is well known in the art that when a UE receives substantially identical data from a plurality of ENBs, the transmissions from the ENBs can augment one another to provide a signal of significantly higher quality than would be the case if only one ENB were transmitting the signal. That is, a higher signal-to-noise ratio can be achieved when substantially the same data is transmitted at substantially the same time on substantially the same resource with substantially the same modulation and coding. A region in which a plurality of substantially identical signals are present is known as a single frequency network, or SFN. In the case where all of the ENBs in a service area are transmitting an MBMS with substantially identical signals, the service area can be referred to a multicast/broadcast SFN (MBSFN).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is a block diagram of user equipment operable for some of the various embodiments of the disclosure.

FIG. 8 is a diagram of a software environment that may be implemented on user equipment operable for some of the various embodiments of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method is provided for providing control information for a multimedia broadcast multicast service (MBMS) in network access equipment. The method includes separating a multicast control channel of an MBMS transmission into a first portion and a second portion, placing in the first portion information related to the second portion, and placing in the second portion information related to receiving a multicast traffic channel portion of the MBMS transmission.

In another embodiment, a user equipment is provided that includes one or more processors. The processors are configured to promote receiving a multicast control channel (MCCH) of a multimedia broadcast multicast service (MBMS) transmission. The MCCH comprises a first portion and a second portion. The first portion includes information related to the second portion. The second portion includes information related to receiving a multicast traffic channel portion of the MBMS transmission.

In another embodiment, a network access equipment in a wireless telecommunications network for transmitting a multimedia broadcast multicast service (MBMS) is provided. The system includes one or more processors configured to promote transmission of a multicast control channel (MCCH) associated with a transmission of the MBMS. The MCCH comprises a first portion and a second portion. The first portion includes information related to retrieving information in the second portion. The second portion includes information related to receiving a multicast traffic channel portion of the MBMS transmission.

Figure 1:
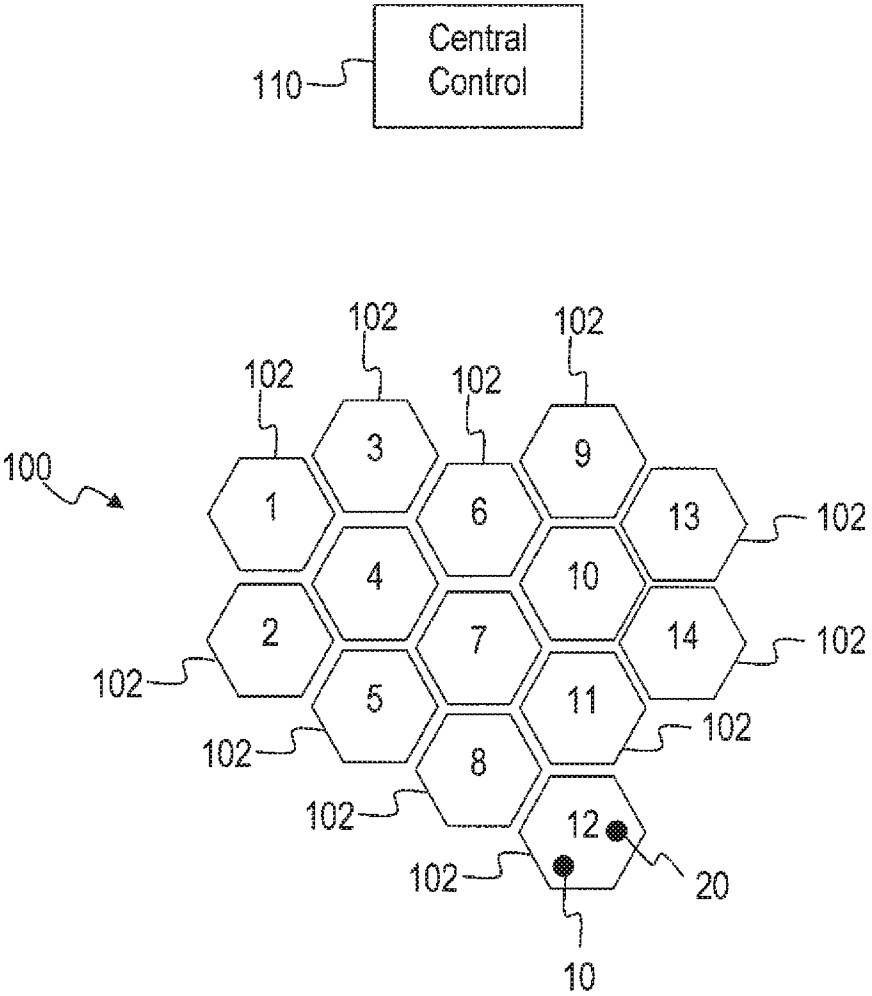
FIG. 1 is an illustration of a cellular network according to an embodiment of the disclosure.

FIG. 1 illustrates an exemplary cellular network 100 according to an embodiment of the disclosure. The cellular network 100 may include a plurality of cells $\mathbf{102}_1$, $\mathbf{102}_2$, $\mathbf{102}_3$, $\mathbf{102}_4$, $\mathbf{102}_5$, $\mathbf{102}_6$, $\mathbf{102}_7$, $\mathbf{102}_8$, $\mathbf{102}_9$, $\mathbf{102}_{10}$, $\mathbf{102}_{11}$, $\mathbf{102}_{12}$, $\mathbf{102}_{13}$, and $\mathbf{102}_{14}$ (collectively referred to as cells 102). As is apparent to persons of ordinary skill in the art, each of the cells 102 represents a coverage area for providing cellular services of the cellular network 100. While the cells 102 are depicted as having non-overlapping coverage areas, persons of ordinary skill in the art will recognize that one or more of the cells 102 may have partially overlapping coverage with adjacent cells. Further, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $\mathbf{102}_{12}$, it will be apparent to one of skill in the art that a plurality of UEs 10 might be present in each of the cells 102. An ENB 20 in each of the cells 102 performs functions similar to those of a traditional base station. That is, the ENBs 20 provide a radio link between the UEs 10 and other components in a telecommunications network. While the ENB 20 is shown only in cell $\mathbf{102}_{12}$, it should be understood that an ENB would be present in each of the cells 102. Also, radio links other than the ENBs 20 could be used. A central control 110 oversees the wireless data transmissions within the cells 102 by providing centralized management and coordination for the cells 102 and their corresponding ENBs 20.

Figure 2:
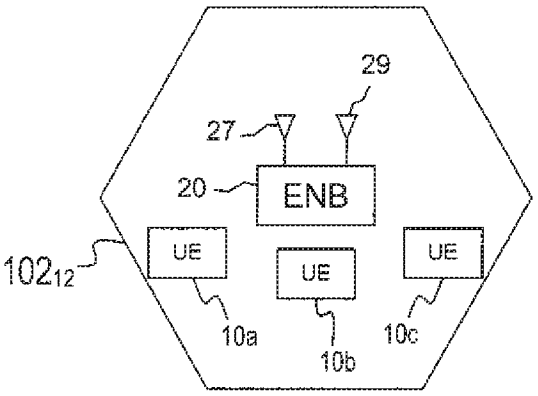
FIG. 2 is an illustration of a cell in a cellular network according to an embodiment of the disclosure.

In the present disclosure, the cellular systems or cells 102 are described as engaged in certain activities, such as transmitting signals; however, as will be readily apparent to one skilled in the art, these activities would in fact be conducted by components comprising the cells. As an example, FIG. 2 depicts a more detailed view of the cell $\mathbf{102}_{12}$. The ENB 20 in cell $\mathbf{102}_{12}$ can promote communication via a transmitter 27, a receiver 29, and/or other well known equipment. Similar equipment might be present in the other cells 102. A plurality of UEs 10 are present in the cell $\mathbf{102}_{12}$, as might be the case in the other cells 102.

The transmission of an MBMS in one or more of the cells 102 can include two components, a multicast control channel (MCCH) and a multicast traffic channel (MTCH). The MTCH delivers the actual content of the MBMS while the MCCH delivers control information related to the MBMS. The MCCH might include key control information that specifies how the content in the MTCH is to be delivered. Configuration information for the MCCH might be transmitted in a broadcast control channel (BCCH). Each of the cells 102 might transmit information over a BCCH to provide the UEs 10 with information about the MBMSs available in the cells 102 and with other information. When one of the UEs 10 powers up, it can receive the BCCH, read the MCCH configuration contained in the BCCH, and determine from the MCCH control information how to receive one or more MTCHs.

In an embodiment, the MCCH control information is divided into two portions: master control information and service control information. The master control information can also be referred to as primary MCCH (P-MCCH) information and the service control information can also be referred to as secondary MCCH (S-MCCH) information. The S-MCCH information can include information about how an MTCH can be received. The P-MCCH information can directly include the S-MCCH information or can include a pointer to a location where the S-MCCH information can be retrieved.

In an embodiment, the S-MCCH information includes control information for one or more MTCH transmissions. This might include scheduling information for one or more MTCHs, modulation and coding information for one or more MTCHs, and SFN-related parameters such as a blocked cell list. Since multiple MTCHs might be transmitted by a single ENB 20, and a different set of S-MCCH information might be needed for each MTCH, multiple sets of S-MCCH information might be associated with the BCCH transmitted by the single ENB 20. A single set of P-MCCH information might be associated with the multiple sets of S-MCCH information.

In various embodiments, the P-MCCH information contains or points to scheduling information for the S-MCCH information. That is, the P-MCCH information specifies when and where the S-MCCH information is available. The UEs 10 can then use the scheduling information in the S-MCCH information to receive one or more MTCHs. The P-MCCH information may also contain service advertisement information, session start information, and modulation and coding information for the S-MCCH information. Service advertisement information might refer to which MBMSs are available within an MBSFN and to similar information. Session start information might refer to the counting information for MBMS transmissions and to similar information.

In the embodiments where multiple MTCHs are transmitted by a single ENB 20, the P-MCCH information can point to scheduling information for each of the sets of S-MCCH information associated with each of the MTCHs. That is, the sets of S-MCCH information that specify how the MTCHs can be received might reside in various locations and/or resources in the downlink transmissions, and the P-MCCH information can include pointers to these locations and/or resources. One of the UEs 10 that wishes to receive a particular MBMS can read the P-MCCH information, find the pointer for the desired MBMS, go to the location and/or resources referred to by the pointer, retrieve the S-MCCH information at that location, and use the S-MCCH information to receive the MBMS. The pointer can remain the same even when the S-MCCH information that it points to changes.

Figure 3A:
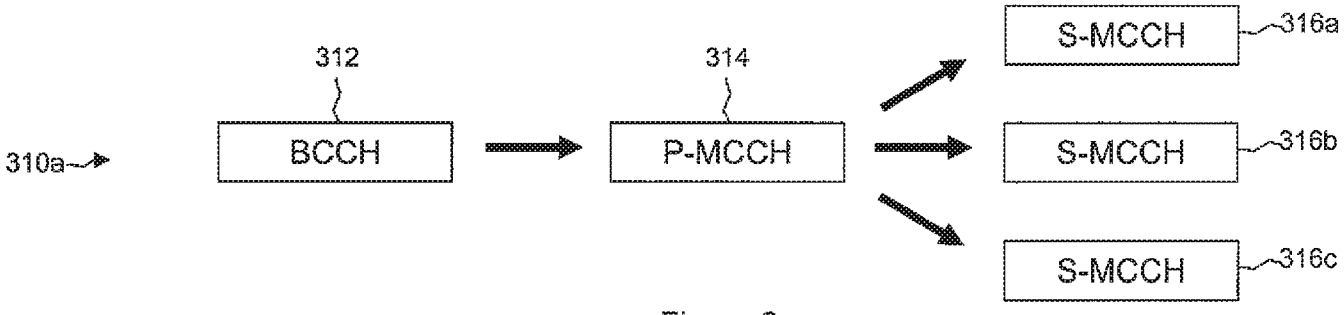
FIG. 3a is a diagram of a structure for multicast control information operable for some of the various embodiments of the disclosure.

FIG. 3a illustrates such a structure 310a for transmitting MCCH control information. A BCCH 312 points to a set of P-MCCH information 314. The P-MCCH information 314 contains pointers to the locations where a plurality of sets of S-MCCH information 316 can be found. Each set of S-MCCH information 316 contains service information for a different MTCH, each of which is associated with a different MBMS.

Figure 3B:
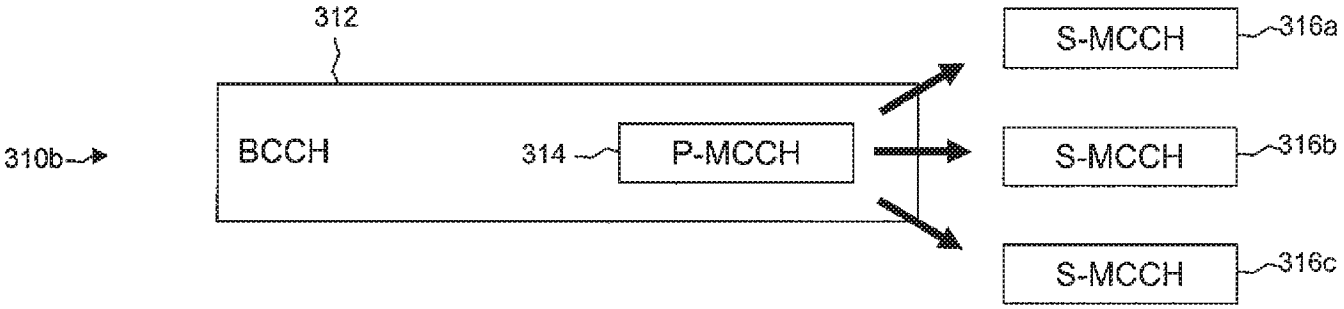
FIG. 3b is a diagram of an alternative perspective of the structure of FIG. 3a operable for some of the various embodiments of the disclosure.

FIG. 3b illustrates an alternative perspective of these embodiments. In this structure 310b for transmitting MCCH control information, the BCCH 312 can be viewed as containing, rather than pointing to, the P-MCCH information 314. As described above, the P-MCCH information 314 might then contain pointers to the locations where the plurality of sets of S-MCCH information 316 can be found. The structures 310a and 310b should be considered equivalent. They are depicted differently here merely to illustrate two different viewpoints from which the P-MCCH information 314 and the sets of S-MCCH information 316 can be conceived.

In alternative embodiments, only a single set of S-MCCH information 316 might be used. For example, if only a single MBMS is being transmitted by an ENB 20, only a single set of S-MCCH information 316 would be transmitted by that ENB 20. In such cases, pointers would not be needed and the S-MCCH information 316 could be carried directly within the P-MCCH information 314 or BCCH 312. One of the UEs 10 that wishes to receive the single MBMS can read the S-MCCH information 316 for the MBMS directly from the P-MCCH information 314 rather than being directed to S-MCCH information 316 by a pointer. The UE 10 can then use the S-MCCH information 316 retrieved in this manner to receive the MBMS.

Figure 4A:
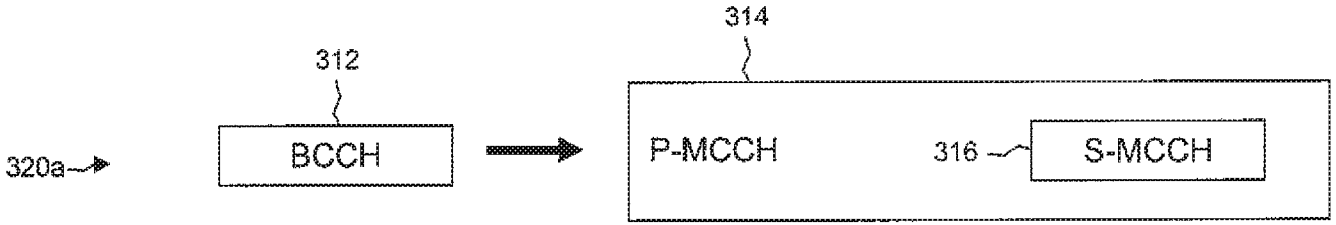
FIG. 4a is a diagram of an alternative structure for multicast control information operable for some of the various embodiments of the disclosure.
Figure 4B:
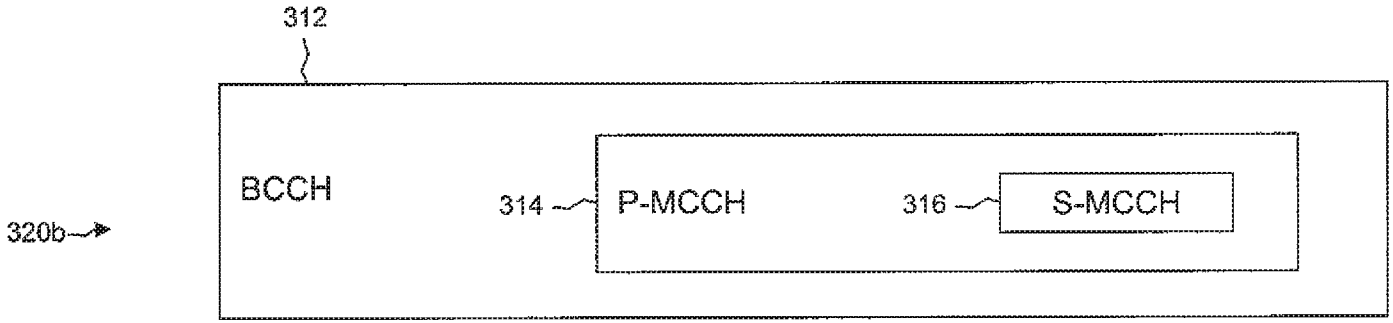
FIG. 4b is a diagram of an alternative perspective of the structure of FIG. 4a operable for some of the various embodiments of the disclosure.

FIG. 4a illustrates such a structure 320a for transmitting MCCH control information. The BCCH 312 points to the set of P-MCCH information 314, which includes within itself the single set of S-MCCH information 316. FIG. 4b illustrates an alternative perspective of the embodiment of FIG. 4a. In this structure 320b, as in that of FIG. 3b, the BCCH 312 can be viewed as containing, rather than pointing to, the P-MCCH information 314. As in FIG. 4a, the P-MCCH information 314 might then contain within itself the single set of S-MCCH information 316. As with the structures 310a and 310b of FIGS. 3a and 3b, the structures 320a and 320b of FIGS. 4a and 4b should be considered equivalent. They are depicted differently here to illustrate two complementary viewpoints of the P-MCCH information 314 and the S-MCCH information 316.

It may be desirable that the BCCH 312 change as little as possible each time it is transmitted. The embodiments described above can promote the BCCH 312 for any particular MBSFN remaining relatively consistent over time. For example, in the embodiments of FIGS. 3a and 3b, the BCCH 312 can include the P-MCCH information 314 directly or can include a pointer to the P-MCCH information 314. The P-MCCH information 314 can then include pointers to one or more sets of S-MCCH information 316. The pointers to the S-MCCH information 316 need not change even if the S-MCCH information 316 itself does change. This can promote consistency in the BCCH signals transmitted at different times.

In the embodiments of FIGS. 4a and 4b, only one set of S-MCCH information 316 is used. In these cases, pointers from the P-MCCH information 314 to the S-MCCH information 316 are not needed, and the S-MCCH information 316 can be merged directly into the P-MCCH information 314. The BCCH 312 can include the P-MCCH information 314 directly or can include a pointer to the P-MCCH information 314. In either case, changes in the BCCH 312 may not be needed, even when the P-MCCH information 314 and/or the S-MCCH information 316 does change.

Figure 5:
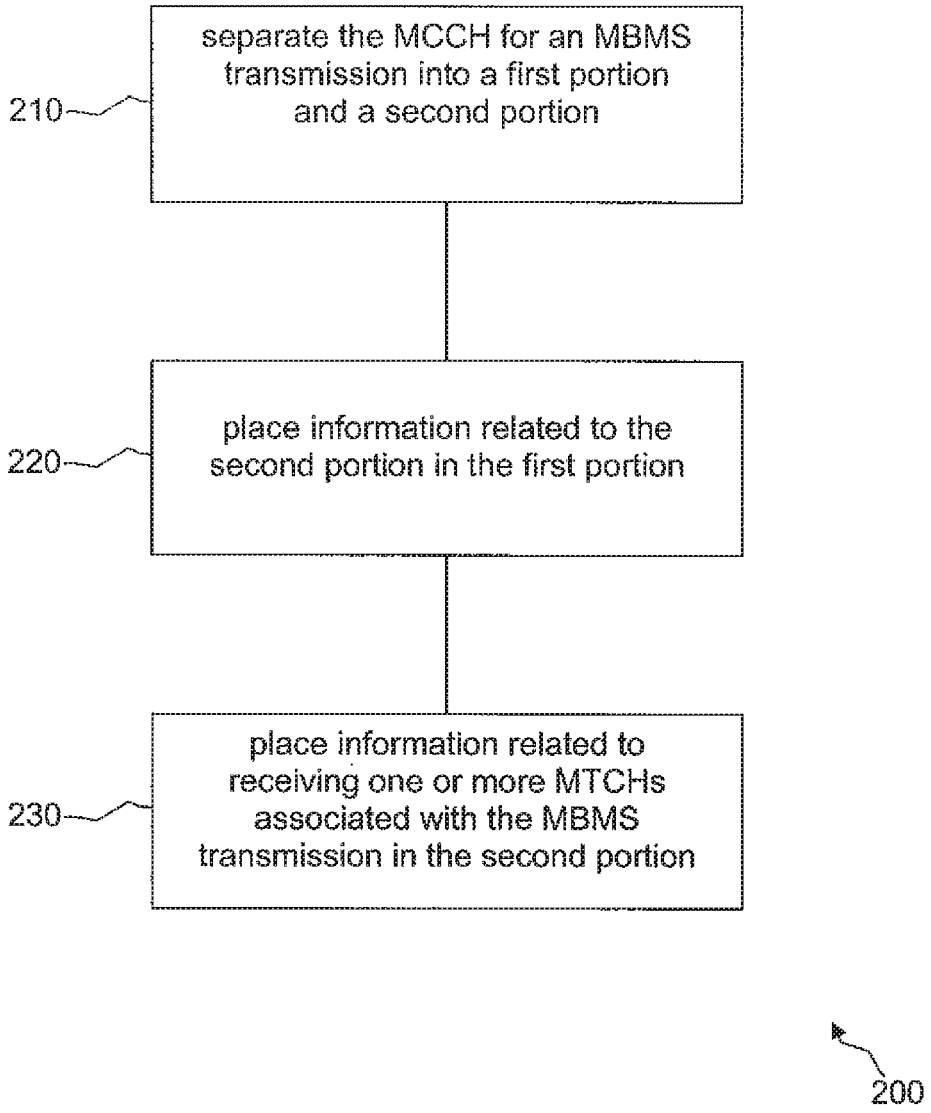
FIG. 5 is a diagram of a method for providing control information for a multimedia broadcast multicast service according to an embodiment of the disclosure.

FIG. 5 illustrates a method 200 for providing control information for an MBMS. In block 210, the MCCH for an MBMS transmission is separated into a first portion and a second portion. In block 220, information related to the second portion is placed in the first portion. The first portion might directly contain the second portion or might contain a pointer to the location of the second portion. The first portion might also include service advertisement information for the MBMS, session start information for the MBMS, and/or modulation and coding information for the information in the second portion. In block 230, information related to receiving one or more MTCHs associated with the MBMS transmission is placed in the second portion. The information related to receiving the MTCHs might include scheduling information for the MTCHs, modulation and coding information for the MTCHs, and/or a blocked cell list.

Figure 6:
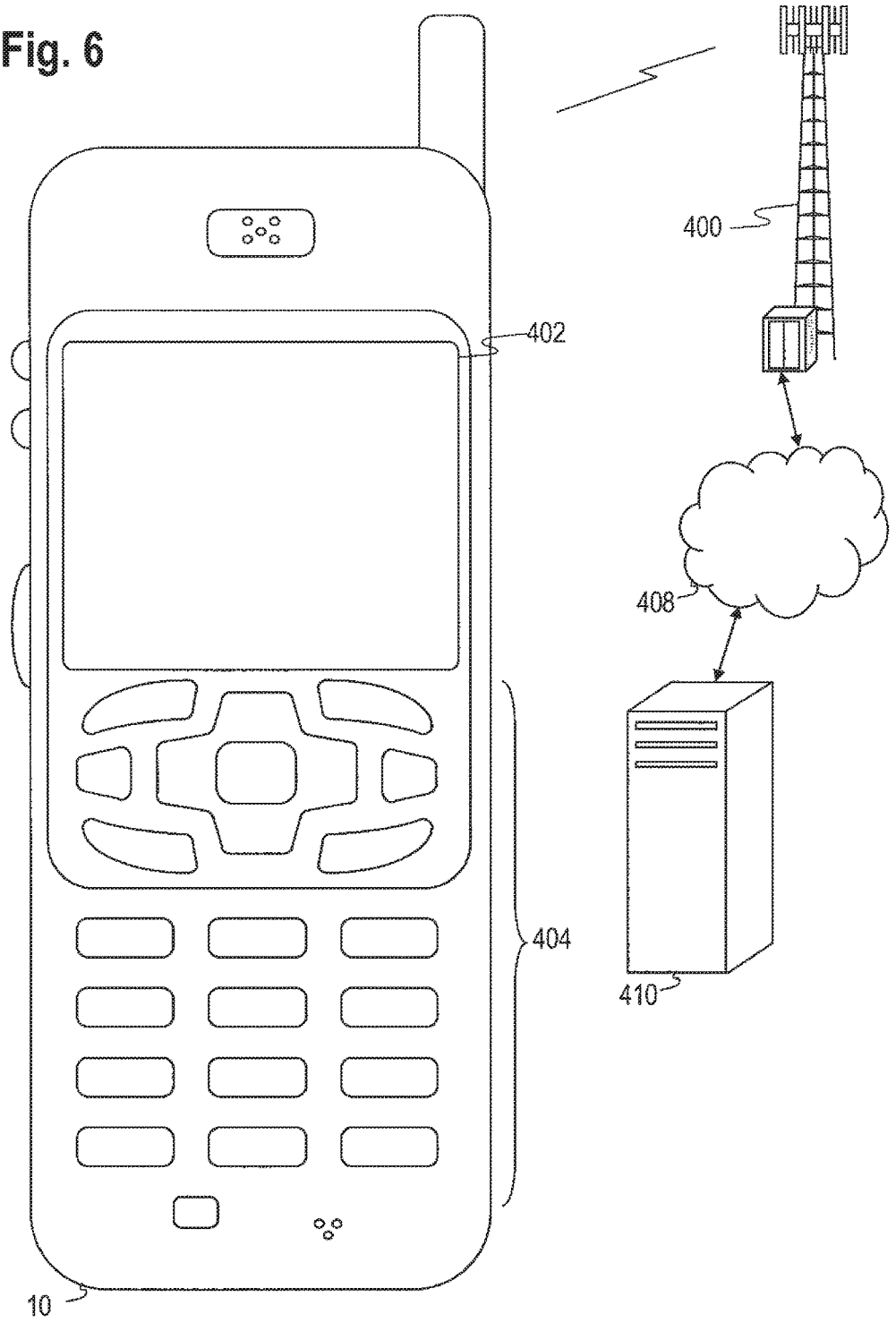
FIG. 6 is a diagram of a wireless communications system including user equipment operable for some of the various embodiments of the disclosure.

FIG. 6 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

FIG. 7 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

FIG. 8 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 8 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to control information transmission.

Figure 9:
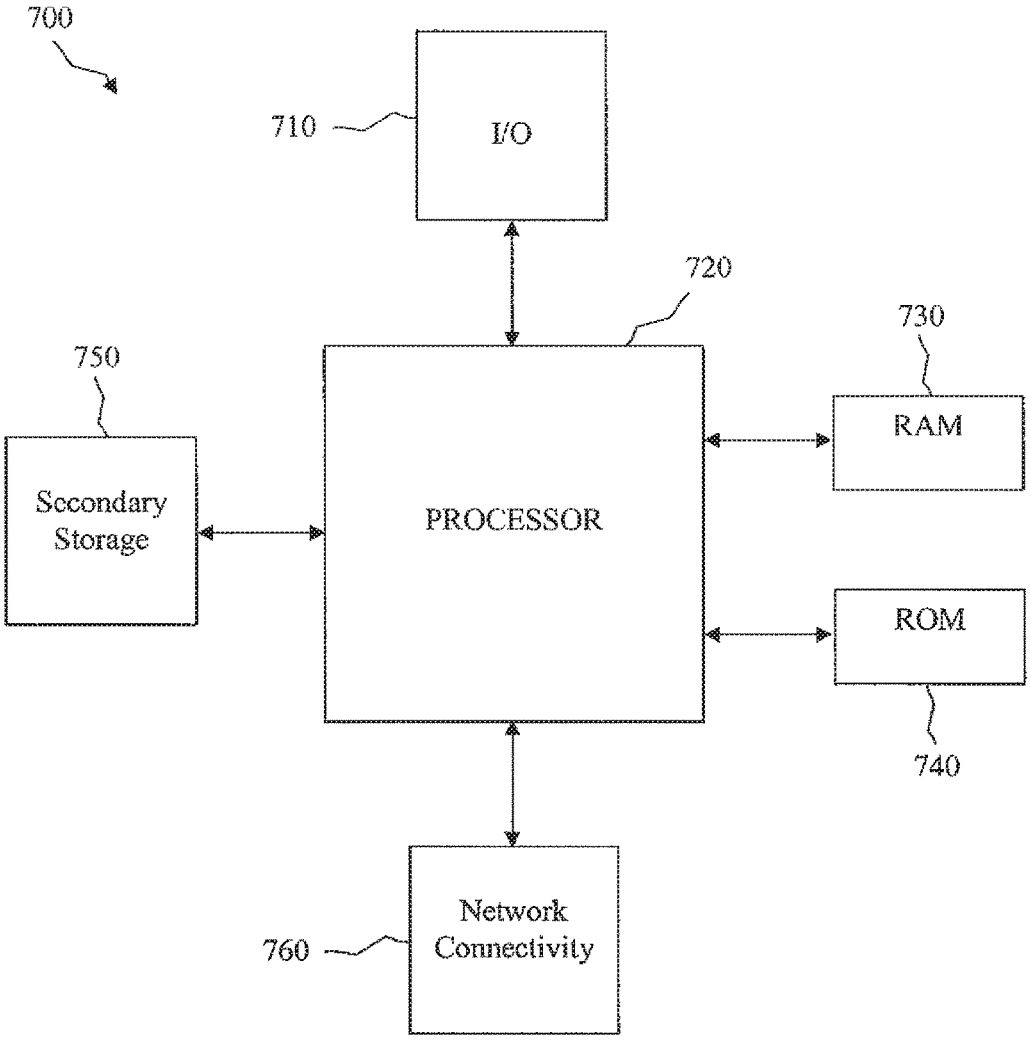
FIG. 9 is an illustrative general purpose computer system suitable for some of the various embodiments of the disclosure.

The central control 110 and ENBs 20 of FIG. 1 and other components that might be associated with the cells 102 may include any general-purpose computer with sufficient processing power, memory resources, and network throughput capability to handle the necessary workload placed upon it. FIG. 9 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing control information for a multimedia broadcast multicast service (MBMS) in *a* network access equipment, comprising:

separating [a], *by the network access equipment,* multicast control [channel (MCCH)] *information* of an MBMS transmission into a first portion and a second portion;

placing, *by the network access equipment,* in the first portion information related to the second portion, wherein *the* information in the first portion comprises*:* modulation and coding information of the second portion; and

*a pointer to a location of information in the second portion related to receiving a multicast traffic channel (MTCH) portion of the MBMS transmission;* placing, *by the network access equipment,* in the second portion *the* information related to receiving [a multicast traffic channel (MTCH)] *the MTCH* portion of the MBMS transmission, wherein the information in the second portion related to receiving the MTCH portion of the MBMS transmission [is at least one of] *comprises*:

[scheduling information for at least one MTCH portion of the MBMS transmission; or]

modulation and coding information for [at least one] *the* MTCH portion of the MBMS transmission*; and*

*transmitting, by the network access equipment, the first portion and the second portion of the multicast control information to a user equipment (UE).*

[2. The method of claim 1, wherein the information in the first portion related to the second portion includes one of:

information in the second portion related to receiving the MTCH portion of the MBMS transmission; and a pointer to a location of the information in the second portion related to receiving the MTCH portion of the MBMS transmission.]

3. The method of claim [2] *1*, wherein the information in the first portion includes the pointer to the information in the second portion related to receiving the MTCH portion of the MBMS transmission when the MBMS is one of a plurality of MBMSs being transmitted in a particular single frequency network.

4. The method of claim 3, wherein the information in the first portion includes a plurality of pointers to a plurality of sets of information in the second portion, each of the plurality of sets of information related to one of the plurality of MBMSs.

5. The method of claim 1, wherein the information in the second portion related to receiving the MTCH portion of the MBMS transmission further comprises a blocked cell list.

[6. The method of claim 1, wherein the information in the first portion directly includes the information in the second portion related to receiving the MTCH portion of the MBMS transmission when the MBMS is the only MBMS being transmitted in a particular single frequency network.]

7. The method of claim 1, wherein the information in the first portion further comprises at least one of:

service advertisement information for the MBMS; and session start information for the MBMS.

8. A user equipment, comprising:

one or more processors [configured]*; and*

*a non-transitory storage medium storing instructions executable on the one or more processors* to [promote receiving a] *receive* multicast control [channel (MCCH)] *information* of a multimedia broadcast multicast service (MBMS) transmission, the [MCCH] *multicast control information* comprising a first portion and a second portion, the first portion including information related to the second portion, wherein *the* information in the first portion comprises*:* modulation and coding information of the second portion*, and*

*a pointer to a location of information in the second portion related to receiving a multicast traffic channel (MTCH) portion of the MBMS transmission*, and the second portion including *the* information related to receiving [a multicast traffic channel (MTCH)] *the MTCH* portion of the MBMS transmission, wherein the information in the second portion related to receiving the MTCH portion of the MBMS transmission [is] *comprises a blocked cell list and* at least one of:

scheduling information for at least one MTCH portion of the MBMS transmission; or modulation and coding information for at least one MTCH portion of the MBMS transmission*, and*

*the instructions executable on the one or more processors to use the pointer and the modulation and coding information in the first portion to retrieve the information in the second portion, and use the information in the second portion to receive the MTCH portion of the MBMS transmission.*

9. The user equipment of claim 8, wherein the information in the first portion related to the second portion further comprises at least one of:

service advertisement information for the MBMS; and session start information for the MBMS.

[10. The user equipment of claim 8, wherein the information in the second portion related to receiving the MTCH portion of the MBMS transmission further comprises a blocked cell list.]

[11. The user equipment of claim 8, wherein the information in the first portion directly includes the information in the second portion related to receiving the MTCH portion of the MBMS transmission when the MBMS is the only MBMS being transmitted in a particular single frequency network in which the MBMS is being transmitted.]

12. The user equipment of claim 8, wherein the information in the first portion includes [a] *the* pointer [to the information in the second portion related to receiving the MTCH portion of the MBMS transmission] when the MBMS is one of a plurality of MBMSs being transmitted in a particular single frequency network.

13. The user equipment of claim 12, wherein the information in the first portion includes a plurality of pointers to a plurality of sets of information in the second portion, each of the plurality of sets of information related to one of the plurality of MBMSs.

14. A network access equipment in a wireless telecommunications network for transmitting a multimedia broadcast multicast service (MBMS), comprising:

one or more processors [configured]*; and*

*a non-transitory storage medium storing instructions executable on the one or more processors* to [promote transmission of a]*:*

*provide* multicast control [channel (MCCH)] *information* associated with a transmission of the MBMS, the [MCCH] *multicast control information* comprising a first portion and a second portion, the first portion including*:* information related to retrieving information in the second portion*, and*

*a pointer to a location of information in the second portion related to receiving a multicast traffic channel (MTCH) portion of the MBMS transmission*, wherein *the* information in the first portion comprises modulation and coding information of the second portion, and the second portion including *the* information related to receiving [a multicast traffic channel (MTCH)] *the MTCH* portion of the MBMS transmission, wherein the information in the second portion related to receiving the MTCH portion of the MBMS transmission [is at least one of] *comprises*:

scheduling information for at least one MTCH portion of the MBMS transmission; [or] *and* modulation and coding information for at least one MTCH portion of the MBMS transmission*; and*

*cause transmission of the first portion and the second portion of the multicast control information to a user equipment (UE).*

[15. The network access equipment of claim 14, wherein the information in the first portion directly includes the information in the second portion related to receiving the MTCH portion of the MBMS transmission when the MBMS is the only MBMS being transmitted in a particular single frequency network.]

16. The network access equipment of claim 14, wherein the information in the first portion includes [a] *the* pointer [to the information in the second portion related to receiving the MTCH portion of the MBMS transmission] when the MBMS is one of a plurality of MBMSs being transmitted in a particular single frequency network.

17. The network access equipment of claim 16, wherein the information in the first portion includes a plurality of pointers to a plurality of sets of information in the second portion, each of the plurality of sets of information related to one of the plurality of MBMSs.

18. The network access equipment of claim 14, wherein the information in the first portion further comprises at least one service advertisement information for the MBMS; and session start information for the MBMS.

19. The network access equipment of claim 14, wherein the information in the second portion related to receiving the MTCH portion of the MBMS transmission further comprises a blocked cell list.

20. The network access equipment of claim 14, wherein the network access equipment is an enhanced node B.

21. A method for providing control information for a multimedia broadcast multicast service (MBMS) in *a* network access equipment, comprising:

separating [a] multicast control [channel (MCCH)] *information* of an MBMS transmission into a first portion and a second portion;

placing in the first portion information related to the second portion, wherein *the* information in the first portion comprises*:*

*a pointer to a location of information in the second portion related to receiving a multicast traffic channel (MTCH) portion of the MBMS transmission, and* modulation and coding information of the second portion, wherein the modulation and coding information is selected from the group consisting of binary phase-shift keying (BPSK), quadrature phase-shift keying (QPSK), and quadrature amplitude modulation (QAM); [and]

placing in the second portion *the* information related to receiving [a multicast traffic channel (MTCH)] *the MTCH* portion of the MBMS transmission*, the information in the second portion comprising modulation and coding information for the MTCH portion of the MBMS transmission; and*

*transmitting, by the network access equipment, the first portion and the second portion of the multicast control information to a user equipment (UE).*

22. A user equipment, comprising:

one or more processors [configured]*; and*

*a non-transitory storage medium storing instructions executable on the one or more processors* to [promote receiving a] *receive* multicast control [channel (MCCH)] *information* of a multimedia broadcast multicast service (MBMS) transmission, the [MCCH] *multicast control information* comprising a first portion and a second portion, the first portion including information related to the second portion, wherein *the* information in the first portion comprises*:*

*a pointer to a location of information in the second portion related to receiving a multicast traffic channel (MTCH) portion of the MBMS transmission, and* modulation and coding information of the second portion, wherein the modulation and coding information is selected from the group consisting of binary phase-shift keying (BPSK), quadrature phase-shift keying (QPSK), and quadrature amplitude modulation (QAM), and the second portion including *the* information related to receiving [a multicast traffic channel (MTCH)] *the MTCH* portion of the MBMS transmission*, the information in the second portion comprising modulation and coding information for the MTCH portion of the MBMS transmission, and*

*the instructions executable on the one or more processors to use the pointer and the modulation and coding information in the first portion to retrieve the information in the second portion, and use the information in the second portion to receive the MTCH portion of the MBMS transmission.*

23. A network access equipment in a wireless telecommunications network for transmitting a multimedia broadcast multicast service (MBMS), comprising:

one or more processors [configured]*; and*

*a non-transitory storage medium storing instructions executable on the one or more processors* to [promote transmission of a]*:*

*provide* multicast control [channel (MCCH)] *information* associated with a transmission of the MBMS, the [MCCH] *multicast control information* comprising a first portion and a second portion, the first portion including information related to retrieving information in the second portion, wherein *the* information in the first portion comprises*:*

*a pointer to a location of information in the second portion related to receiving a multicast traffic channel (MTCH) portion of the MBMS transmission, and* modulation and coding information of the second portion, wherein the modulation and coding information is selected from the group consisting of binary phase-shift keying (BPSK), quadrature phase-shift keying (QPSK), and quadrature amplitude modulation (QAM), and the second portion including *the* information related to receiving [a multicast traffic channel (MTCH)] *the MTCH* portion of the MBMS transmission*, the information in the second portion comprising modulation and coding information for the MTCH portion of the MBMS transmission; and*

*cause transmission of the first portion and the second portion of the multicast control information to a user equipment (UE).*

* * * * *